UNITED STATES PATENT OFFICE.

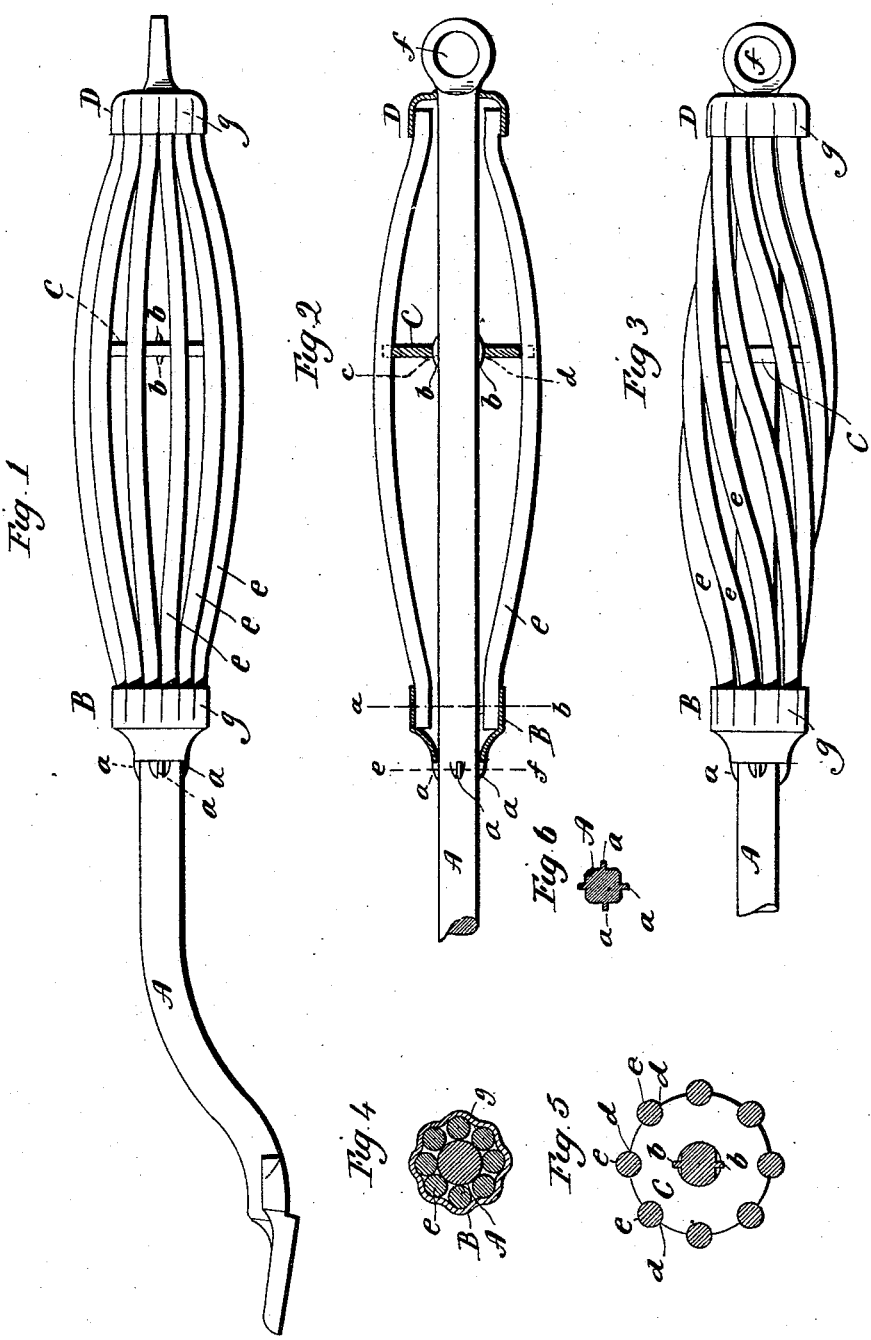

CHARLES L. DAYTON, OF MERIDEN, CONNECTICUT.

HANDLE FOR FIRE IRONS AND IMPLEMENTS.

SPECIFICATION forming part of Letters Patent No. 536,800, dated April 2, 1895.

Application filed November 19, 1894. Serial No. 529,252. (No model.)

*To all whom it may concern:*

Be it known that I, CHARLES L. DAYTON, of Meriden, in the county of New Haven and State of Connecticut, have invented a new Improvement in Handles for Fire Irons and Implements; and I do hereby declare the following, when taken in connection with the accompanying drawings and the letters of reference marked thereon, to be a full, clear, and exact description of the same, and which said drawings constitute part of this specification, and represent, in—

Figure 1, a side view of a stove-cover lifter illustrating the application of my improved handle thereto; Fig. 2, a sectional view of the outer end of the shank and handle of an implement; Fig. 3, a side view of the outer end of a shank and handle illustrating a modification in the arrangement of the wires forming the handle; Fig. 4, a section on line $a$—$b$ of Fig. 2; Fig. 5, a section on line $c$—$d$ of Fig. 2; Fig. 6, a section on line $e$—$f$ of Fig. 2.

This invention relates to an improvement in handles for fire-irons, such as stove-cover lifters, pokers, and so forth, but applicable to various other devices, and the invention particularly relates to an improvement in that class in which the handles or grips are formed from wire, the object of this invention being to produce an extremely strong handle, one easily applicable to various implements, and one which will not retain heat, and the invention consists in the construction as hereinafter described and particularly recited in the claims.

A represents the shank of an implement, which, for convenience of illustration, I have shown in Fig. 1 as that of a stove-cover lifter. At a proper distance from its end, wings or abutment lugs $a$ $a$ are formed by drawing a portion of the metal shank outward, and against which a socket B is placed, the internal diameter of the said socket corresponding to the diameter of the shank, its outer end flaring so as to form a chamber around said shank, the lugs $a$ forming a seat against which said socket rests. Near the outer end of the said shank wings $b$ $b$ are formed, and over the shank and into engagement with said wings and so as to be held against rotation thereby a collar C is placed, the diameter of said collar C, being considerably greater than that of the enlarged portion of the socket B, and its periphery is formed with a series of notches $d$. The handle proper consists of a series of wires $e$ $e$, corresponding in number to the number of notches in the collar C. These wires are bowed, so that when placed in the notches $d$, their inner ends may be seated within the socket B, and their outer ends rest near and against the outer end of the shank A. Over the end of the shank A, and the outer ends of the wires, a socket D, is placed said socket corresponding substantially to the socket B, and so as to inclose the outer ends of the wires, and hold them against the shank A. As herein shown this socket D, is secured in position by upsetting or flattening the end of the shank A, said flattened portion being formed with an eye $f$, which forms a convenient means for suspending the implement. As herein shown, and preferably, the sockets B D are corrugated so as to form a space for and firmly locate the ends of each of the wires $e$, it being understood that the ends of the wires are sprung into the socket D, and so that they retain their position in the notches $d$ of the collar C.

Instead of extending the wires in a plane parallel with the plane of the shank A, they may be curved, as indicated in Fig. 3, the corrugations $g$ in the sockets B and D, forming a firm support for the ends of the wires in this curved position. Instead of securing the sockets B and D by upsetting portions of the shank, they may be secured by bending the shank, or by rivets extending through said sockets and shank, such construction being too apparent to require illustration, the method of securing the sockets to the shank depending entirely upon the style of implement to which the handle is applied. The collar C being firmly seated on the shank A, forms a solid support for the wires $e$, thus forming a very substantial handle, and on account of the fact that the wires $e$ have such a slight connection with the shank A, heat from the shank A will not be transmitted to them.

If desired other handles of other material, such as wood might be secured to the shank of implements by forming the abutment lugs as above described, and against which a socket to receive the end of the handle may be seated. I therefore do not wish to be understood as limiting my invention to a wire handle which broadly considered, is not new.

I claim—

1. The combination with the shank of a fire-iron, of a handle comprising a series of longitudinally bowed wires, circularly arranged around the end of the shank which extends centrally between them, and with which their ends are connected, and a collar mounted upon the said shank between the ends of the wires, and forming a support therefor, substantially as described.

2. The combination with the shank of a fire-iron, of a handle comprising a series of longitudinally bowed wires circularly arranged about the said shank, two sockets secured to the said shank, and adapted to receive the ends of the wires, and a collar mounted on the shank between the ends of the wires, and forming a support therefor, substantially as described.

3. The combination with the shank of a fire-iron, of a handle comprising a series of longitudinally bowed wires circularly arranged about the said shank, and two corrugated sockets mounted upon the shank, opening inward and having a corrugation for each wire, the ends of which they receive, substantially as described.

4. The combination with the shank of a fire-iron, of a handle comprising a series of longitudinally bowed wires circularly arranged about the said shank, to which their ends are secured and a collar mounted upon the said shank between the ends of the wires, and constructed with notches to receive the same whereby they are supported, substantially as described.

5. The combination with the shank of a fire-iron or kindred implement, the said shank upset to form integral outwardly projecting abutment lugs formed upon it, and a handle comprising a socket located at its forward end, and abutted against the said integral abutment lugs, the outer end of said handle secured to said shank substantially as described.

6. The combination with the shank of a fire-iron or kindred implement, said shank being provided with one or more locking lugs formed integral with it, of a handle comprising a series of longitudinally bowed wires circularly arranged upon the said shank with which their ends are connected, and a collar mounted upon the shank between the ends of the wires which it supports, and adapted to coact with the said locking lugs to prevent the rotation of it upon the shank, substantially as described.

7. The combination with the shank of a fire-iron or kindred implement, having its outer end flattened and enlarged, and perforated to form an eye, of a handle comprising a series of longitudinally bowed wires circularly arranged around the shank, two sockets opening inward, connected with the shank and adapted to receive the ends of the wires, and a collar mounted upon the shank between the ends of the wires which it supports, substantially as described.

In testimony whereof I have signed this specification in the presence of two subscribing witnesses.

CHAS. L. DAYTON.

Witnesses:
W. F. COOPER,
M. S. PIPER.